(12) United States Patent
Wilson et al.

(10) Patent No.: US 10,962,783 B2
(45) Date of Patent: Mar. 30, 2021

(54) ELECTRONIC DEVICES HAVING ELECTRICALLY ADJUSTABLE OPTICAL LAYERS

(71) Applicant: Apple Inc., Cupertino, CA (US)

(72) Inventors: James R. Wilson, Cupertino, CA (US); James W. Vandyke, San Francisco, CA (US); Matthew S. Rogers, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/412,292

(22) Filed: May 14, 2019

(65) Prior Publication Data

US 2019/0384062 A1  Dec. 19, 2019

Related U.S. Application Data

(60) Provisional application No. 62/687,183, filed on Jun. 19, 2018.

(51) Int. Cl.
*G02B 27/01* (2006.01)
*G06F 1/16* (2006.01)
*G02F 1/1335* (2006.01)

(52) U.S. Cl.
CPC ..... *G02B 27/0172* (2013.01); *G02B 27/0176* (2013.01); *G02F 1/133514* (2013.01); *G02F 1/133553* (2013.01); *G06F 1/1626* (2013.01); *G06F 1/1656* (2013.01); *G02B 2027/0178* (2013.01)

(58) Field of Classification Search
CPC .... G06F 1/1656; G06F 1/1626; G06F 1/1637; G02F 1/133514; G02F 1/133553; G02B 27/0172; G02B 27/0176; G02B 2027/0178; G02B 2027/0187
See application file for complete search history.

(56) References Cited

U.S. PATENT DOCUMENTS

| | | |
|---|---|---|
| 6,452,572 B1 | 9/2002 | Fan et al. |
| 8,488,246 B2 | 7/2013 | Border et al. |
| 9,091,851 B2 | 7/2015 | Border et al. |
| 9,826,299 B1 | 11/2017 | Osterhout et al. |
| 2008/0165146 A1 | 7/2008 | Matas |

(Continued)

FOREIGN PATENT DOCUMENTS

| | | |
|---|---|---|
| JP | 2002271664 A | 9/2002 |
| WO | 2016126460 A2 | 8/2016 |

*Primary Examiner* — Abbas I Abdulselam
(74) *Attorney, Agent, or Firm* — Treyz Law Group, P.C.; G. Victor Treyz; David K. Cole (57) ABSTRACT

An electronic device has an electrically adjustable optical layer. Displays and other optical components may be supported by a housing structure. The housing structure may form a handheld device housing, a head-mounted housing, or other housing for the electronic device. Control circuitry in the electronic device may adjust the electrically adjustable optical layer. The control circuitry may reduce light transmission for the electrically adjustable optical layer to hide the optical components, may increase light transmission to reveal the optical components while the optical components are being used to receive light or to output light, and may otherwise adjust the electrically adjustable optical layer to exhibit a desired set of optical characteristics depending on the mode of operation of the electronic device.

23 Claims, 8 Drawing Sheets

(56) References Cited

U.S. PATENT DOCUMENTS

| | | |
|---|---|---|
| 2009/0027759 A1 | 1/2009 | Albahri |
| 2012/0026419 A1 | 2/2012 | Takenaka et al. |
| 2012/0062445 A1 | 3/2012 | Haddick et al. |
| 2014/0063049 A1 | 3/2014 | Armstrong-Muntner |
| 2014/0120988 A1 | 5/2014 | Gunn et al. |
| 2014/0267874 A1 | 9/2014 | Ratcliff et al. |
| 2016/0018658 A1 | 1/2016 | Machida et al. |
| 2016/0147091 A1 | 5/2016 | Christmann et al. |
| 2016/0223817 A1* | 8/2016 | Kizu ................ G02B 3/0056 |
| 2017/0011553 A1* | 1/2017 | Chen ................ G06F 3/005 |
| 2017/0097537 A1* | 4/2017 | Park ................ H01L 27/3232 |
| 2017/0176777 A1* | 6/2017 | Blum ................ G02C 11/10 |
| 2017/0336637 A1* | 11/2017 | Van Heugten ........ G02B 27/16 |
| 2018/0252927 A1* | 9/2018 | Inoue ................ A61B 3/0083 |

\* cited by examiner

| MODE | STATE |
|---|---|
| MODE 1 | STATE 1 (E.G., DARK) |
| MODE 2 | STATE 2 (E.G., CLEAR) |
| MODE 3 | STATE 3 (E.G., GRAY) |
| MODE 4 | STATE 4 (E.G., REFLECTIVE) |
| MODE 5 | STATE 5 (E.G., FLASHING) |

ELECTRONIC DEVICES HAVING ELECTRICALLY ADJUSTABLE OPTICAL LAYERS

This application claims the benefit of provisional patent application No. 62/687,183, filed Jun. 19, 2018, which is hereby incorporated by reference herein in its entirety.

FIELD

This relates generally to electronic devices, and, more particularly, to electronic devices with optical components and electrically adjustable layers.

BACKGROUND

Electronic devices are sometimes provided with optical components. The optical components may include components such as an image sensor (camera), a camera flash, an optical proximity sensor, or an ambient light sensor. Components such as these generally operate through windows in device housings or portions of a display. Although optical coating structures can sometimes be provided on windows to help blend their visual appearance with surrounding structures, windows characteristics are generally inflexible, making it difficult or impossible to effectively hide an optical component behind a window while accommodating changes in the operating environment for a device.

SUMMARY

An electronic device has an electrically adjustable optical layer. Displays and other optical components may be supported by a housing structure. The housing structure may form a handheld device housing, a head-mounted housing, or other housing for the electronic device. The electrically adjustable optical layer may overlap a display and other optical components.

During operation, control circuitry in the electronic device may adjust the electrically adjustable optical layer. The control circuitry may reduce light transmission for the electrically adjustable optical layer to hide the optical components, may increase light transmission to reveal the optical components while the optical components are being used to gather data or supply output, and may be otherwise adjusted to exhibit a desired set of optical characteristics depending on the mode of operation of the electronic device.

The electrically adjustable optical layer may include an adjustable light transmission layer such as a guest-host liquid crystal layer, electrochromic layer, or other layer of adjustable light transmission. The electrically adjustable optical layer may also include adjustable layers exhibiting adjustable haze, adjustable color, and/or adjustable reflectivity.

In some configurations, an electronic device may have a housing configured to be held in the hand of a user. In this type of arrangement, a front face of the device may have a display and other optical components and the display and/or the other optical components may be overlapped by the electrically adjustable optical layer.

In other configurations, an electronic device may have a head-mountable housing with front and rear faces. The rear face of the housing may have display systems configured to present images to eye boxes for viewing by a user. An outwardly facing front face of the housing may have a display and other optical components that are overlapped by the electrically adjustable optical layer.

DETAILED DESCRIPTION

Electronic devices may be provided with optical components. The optical components may be mounted in an electronic device housing. An electrically adjustable optical layer may overlap an optical component. The electrically adjustable optical layer may be adjusted based on changes in an electronic device's operating environment or other parameters. Optical characteristics of the electrically adjustable optical layer that may be adjusted include light transmission, reflectivity, absorption, color, and haze.

Dynamic adjustments may be made with the electrically adjustable optical layer to help adjust the outward appearance of an electronic device. For example, the light transmission of an electrically adjustable optical layer may be dynamically adjusted to allow light to pass or to provide the electrically adjustable optical layer with an opaque appearance or other desired appearance. In some configurations, the electrically adjustable optical layer may be placed in a partially transparent state. If desired, an electrically adjustable optical layer may be adjusted to inform a viewer of the device about the operating state of the device. For example, text, icons, and other patterns may be displayed using an electrically adjustable optical layer whenever an electronic device is actively using a camera or other input device.

Figure 1:
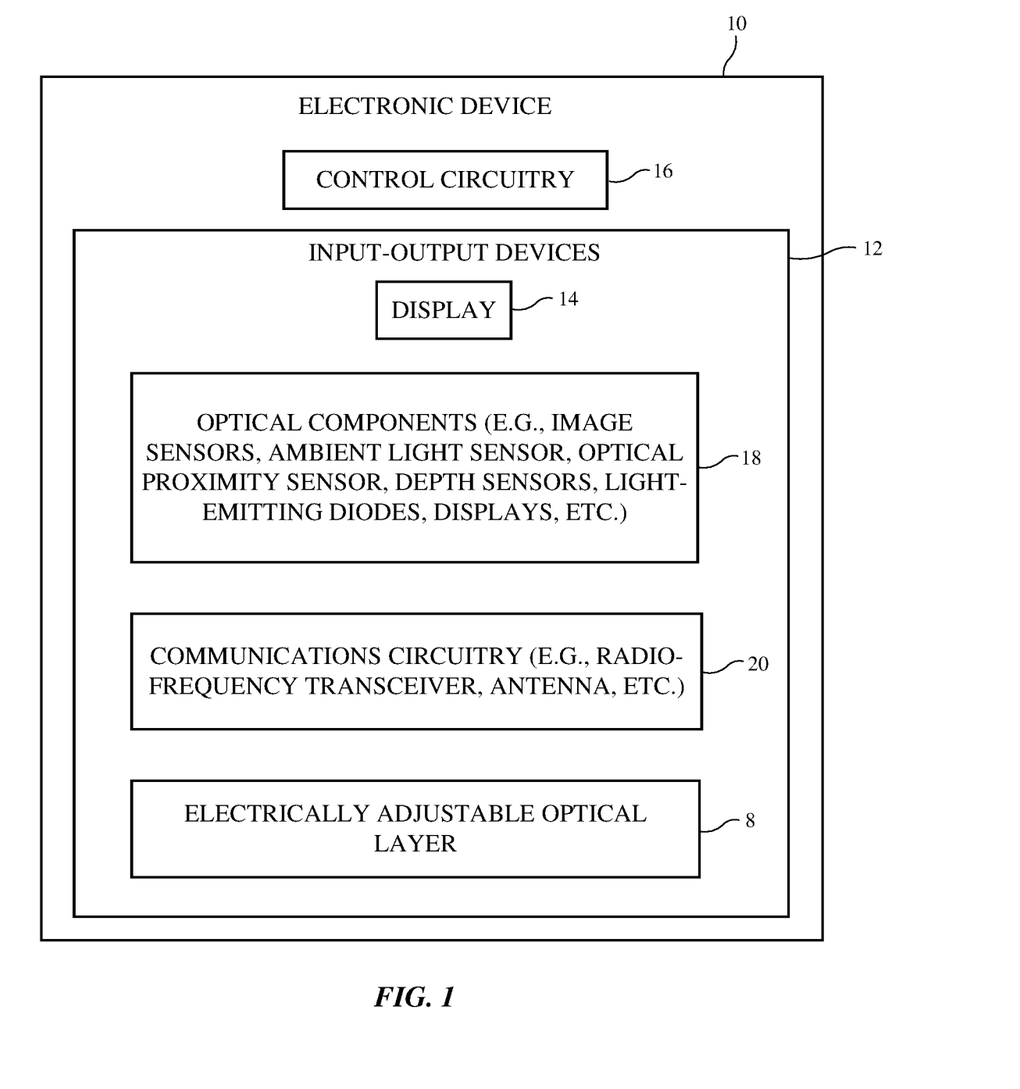
FIG. 1 is a schematic diagram of an illustrative electronic device with optical components and electrically adjustable optical layers in accordance with an embodiment.

An illustrative electronic device of the type that may be provided with an electrically adjustable optical layer is shown in FIG. 1. Electronic device 10 may be a computing device such as a laptop computer, a desktop computer such as a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses, goggles, or a helmet, or other equipment worn on a user's head (e.g., virtual reality or mixed reality devices such as head-mounted virtual reality and/or mixed reality devices), or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Device 10 may have input-output circuitry such as input-output devices 12. Input-output devices 12 may include user input devices that gather user input and output components that provide a user with output. Devices 12 may also include sensors that gather information from the environment. Communications circuitry 20 may be used to receive data for device 10 and may be used to supply data from device 10 to external devices. Communications circuitry 20 may include one or more antennas and associated radio-frequency transceiver circuitry. The transceiver circuitry may include wireless local area network transceiver circuitry, cellular telephone transceiver circuitry, and/or other radio-frequency transceiver circuitry and may operate in any suitable frequency band (e.g., a frequency of 700-2700 MHz, 2.4-5 GHz, less than 700 MHz, more than 2700 GHz, etc.). If desired, communications circuitry 20 may also include circuitry for supporting wired communications between device 10 and external equipment.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. Display 14 may be a liquid crystal display, a light-emitting diode display (e.g., an organic light-emitting diode display), an electrophoretic display, a microelectromechanical systems (MEMs) display, or other display. More than one type of display may be used in device 10, if desired. For example, device 10 may be a head-mounted device having a first display (or set of displays) that form parts of an inwardly-facing display system for presenting content that is viewed by a user (e.g., a user wearing device 10) and a second display for presenting publically viewable content to viewers other than the user. As another example, a single display may be included in device 10 that is viewable by both the user and nearby viewers (e.g., when the display is mounted on a front face of a handheld device such as a cellular telephone).

Input-output devices 12 may include optical components 18. Optical components 18 may include ambient light sensors (e.g., color ambient light sensors configured to measure ambient light color and intensity by making light measurements with multiple light detector channels each of which has a corresponding color filter and photodetector to measure light in a different wavelength band), optical proximity sensors (e.g., sensors with a light-emitting device such as an infrared light-emitting diode and a corresponding light detector such as an infrared photodiode for detecting when an external object that is illuminated by infrared light from the light-emitting diode is in the vicinity of device 10), a visible light camera (visible light digital image sensor), an infrared light camera (infrared digital image sensor), light-emitting diodes and/or laser diodes that emit flash illumination for visible light cameras (sometimes referred to as camera flash), infrared light-emitting diodes that emit illumination for infrared cameras, light sources based on one or more lasers (e.g., an array of infrared lasers emitting infrared light beams for a structured light depth sensor having a digital image sensor such as an infrared light camera that captures images of objects illuminated by the light beams), light-emitting diodes and/or lasers and sensors that support optical communications in an optical data port, light-emitting diodes that serve as status indicators (e.g., a power on/off indicator, etc.), and/or other optical components.

In addition to optical components 18, input-output devices 12 may include buttons, joysticks, scrolling wheels, touch pads, key pads, keyboards, microphones, speakers, tone generators, vibrators, cameras, lasers, light-emitting diodes and other status indicators, non-optical sensors (e.g., temperature sensors, microphones, capacitive touch sensors, force sensors, gas sensors, pressure sensors, sensors that monitor device orientation and motion such as inertial measurement units formed from accelerometers, compasses, and/or gyroscopes), data ports, etc. A user can control the operation of device 10 by supplying commands through input-output devices 12 and may receive status information and other output from device 10 using the output resources of input-output devices 12.

Device 10 may have one or more electrically adjustable optical devices such as electrically adjustable optical layer 8. Layer 8 may be adjusted to operate in different modes. For example, in different modes of operation, layer 8 may exhibit different light transmission values (e.g., a high transmission value of at least 80% or at least 90% or a low transmission value of less than 40%, less than 20%, or less than 10%), different colors (e.g., non-neutral colors such as blue, red, green, blue-black, etc.), different neutral colors (white, black, gray, etc.), different reflectivities (e.g., a low reflectivity of less than 40%, less than 20%, or less than 10% or a high reflectively of more than 60%, more than 80%, or more than 90%), different light absorption values (and/or different light absorption spectral shapes), different amounts of haze, and/or other properties that vary the appearance and/or light transmission, absorption, reflection, color, and/or haze of layer 8. Electrically adjustable optical layer 8 may be formed from a liquid crystal device such as a guest host liquid crystal device, a liquid crystal device with polarizers, or a cholesteric liquid crystal device, an electrochromic device, a suspended particle device, an electrophoretic device, an electrowetting device, an adjustable color filter, and/or other adjustable devices that exhibit adjustable optical properties such as haze, color, light reflection, light absorption, and/or light transmission.

Figure 2:
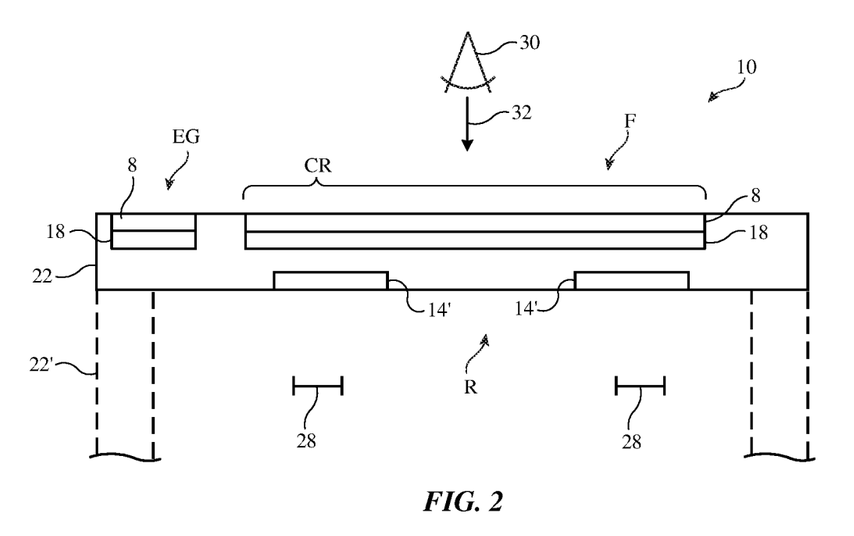
FIG. 2 is a cross-sectional view of an illustrative electronic device in accordance with an embodiment.

Device 10 may have a housing. The housing may form a laptop computer enclosure, an enclosure for a wristwatch, a cellular telephone enclosure, a tablet computer enclosure, an enclosure for a wearable device such as a head-mounted device (e.g., head-mountable housing structures for glasses, goggles, a helmet, or wearable device), or other suitable device enclosure. A side view of an illustrative electronic device is shown in FIG. 2. The illustrative device of FIG. 2 has a planar configuration (e.g., for a portion of a laptop computer, a tablet computer, a cellular telephone, etc.). Device 10 may also form a laptop computer or other equipment. This arrangement is presented as an example. In arrangements in which device 10 is worn on a user's head, device 10 may have a curved housing configured to conform to the curved surface of a user's face. The curved housing may, for example, have a convex front face that faces outwardly and an opposing concave rear face that faces inwardly toward the head of the user. Glass layers, polymer layers, and/or other layers of material that form parts of fixed and/or adjustable components in device 10 may, if desired, be used in forming some or all of the housing (support structures) for device 10. In general, the housing of device 10 may have any suitable configuration.

In the example of FIG. 2, device 10 has a first face F and an opposing second face R. In some arrangements, such as when device 10 is a cellular telephone or other handheld portable device, first face F may sometimes be referred to as the front face F of device 10 and second face R may sometimes be referred to as rear face R. In configurations in which device 10 is worn on a user's head (e.g., when device 10 is a head-mounted device), first face F may sometimes be referred to as the front face F or outwardly directed face F of device 10 and second face R may sometimes be referred to as the rear face R or inwardly directed face R of device 10.

The components of device 10 may be supported by support structures such as housing 22 or other support structures. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 22 may be formed using a unibody configuration in which some or all of housing 22 is machined or molded as a single structure or may be formed using multiple structures (e.g., an internal frame structure, one or more structures that form exterior housing surfaces, etc.). Optional housing portions 22' (e.g., helmet sidewalls or strap structures, temples in a pair of glasses, a strap or other supportive head band structure for goggles, etc.) may be included in housing 22 when device 10 is configured to be worn on a head of a user.

Device 10 may include one or more displays. For example, in a head-mounted device configuration, device 10 may include inwardly facing display systems 14' (e.g., displays and lenses or other optical system components configured to direct virtual reality and/or mixed reality images to a user's eyes located in eye boxes 28).

Optical components 18 may be mounted on face R and/or face F. As shown in FIG. 2, for example, a first optical component 18 may be mounted in central region CR of front face F. This first optical component 18 may be, for example, a display (see, e.g., display 14 of FIG. 1) or other optical component 18. A second optical component 18 (and, if desired, additional optical components 18) may be mounted in other portions of front face F such as portion EG of front face F. Electrically adjustable optical layer 8 may overlap one or more optical components 18. Layer 8 may, if desired, have independently adjustable portions (layers) formed using independently adjustable electrodes on a common layer of material and/or on multiple different layers of material. For example, a first portion of layer 8 may overlap components 18 in region EG and a second portion of layer 8 may overlap components 18 in region CR. Configurations in which separate individually adjustable optical devices overlap respective optical components 18 may also be used. By overlapping components 18 with layer 8, layer 8 is interposed between components 18 and viewers such as viewer 30 that are viewing device 10 in direction 32. Viewer 30 may be a user of device 10 or may be another individual.

During operation, layer 8 can be adjusted to facilitate operation of components 18, to provide information to viewers such as viewer 30 (e.g., a user of device 10 or another person), etc. Layers 8 may, for example, be adjusted to exhibit a dark appearance or other obscuring appearance when it is desired to block components 18 from view by viewer 30 or may be adjusted to exhibit a clear appearance when it is desired to allow light to pass through layers 8 so that optical components 18 can emit and/or receive light. Arrangements in which the haze, color, reflectivity, and/or other optical characteristics of layer 8 are adjusted may also be used.

Housing 22 may be used to support optical components 18 and layer 8 (e.g., optical components 18 may be located between layer 8 and housing 22). There may, in general, be any suitable number of optical components 18 in device 10 (e.g., at least one, at least two, at least three, at least four, at least five, at least 10, at least 20, fewer than 25, fewer than 15, fewer than seven, etc.) and these components may be mounted on face F, face R, sidewall portions of device 10, straps and other supporting portions of device 10 (e.g., housing portions 22'), and/or on other portions of device 10. There may be fewer layers 8 than optical components 18, the number of separate adjustable layers 8 may be equal to the number of optical components 18, or there may be more of layers 8 than optical components 18. Each layer 8 may have one or more individually adjustable regions.

Figure 3:
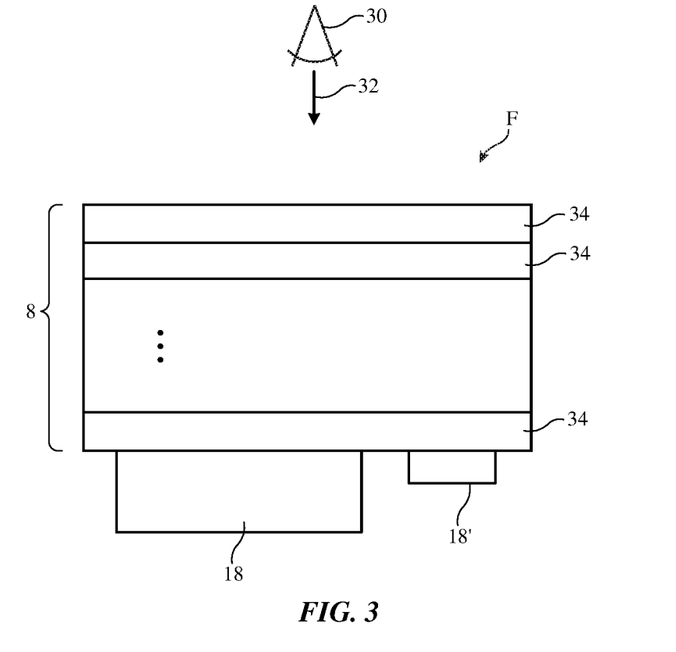
FIG. 3 is a cross-sectional side view of an illustrative electrically adjustable optical layer overlapping an optical component in accordance with an embodiment.

An illustrative electrically adjustable optical layer 8 is shown in FIG. 3. As shown in FIG. 3, electrically optical layer 8 may cover optical component 18 and may, if desired, be mounted on face F of device 10. Electrically optical layer 8 may include one or more sublayers such as layers 34. Layers 34 may exhibit fixed and/or electrically adjustable optical characteristics. Optical component 18 may emit and/or receive light during operation. If desired, structures that do not emit and/or receive light such as structure 18' may also be overlapped by the same layer 8 that overlaps component 18 and/or a different layer 8. Structure 18' may be formed from metal, polymer (e.g., colored ink), glass, and/or other materials and may have the shape of an icon, text, or other shape. The shape of structure 18' (e.g., the icon formed by structure 18', the textual content of structure 18', etc.) may be hidden from view by layer 8 by placing layer 8 in an opaque state and may be revealed from view by placing layer 8 in a transparent state (as examples). Because structure 18' may be configured to convey an alert message to a viewer (e.g., a status indication, warning, or other visual notification), structure 18' may sometimes be referred to as a notification structure or static notification structure, icon, text, notification, etc.

One or more of layers 34 of layer 8 may be electrically adjustable. Layers 34 may also include non-adjustable layers. For example, one or more of layers 34 may exhibit a desired fixed amount of light transmission, reflection, absorption, haze, and color cast to light passing through that layer. A fixed color cast layer may be formed from a coating layer of polymer or other material that includes colorant such as dye or pigment. A fixed haze layer may be formed from a textured layer or a layer incorporating light-scattering particles. A layer with fixed reflectivity, light transmission, and light absorption may be formed from a thin metal layer or one or more layers of other material. Thin-film interference filters formed from stacks of thin films (e.g., dielectric stacks of alternating higher and lower refractive index values) may also be used as optical layers with fixed optical characteristics. In some arrangements, partially reflective layers may be formed (e.g., a partially reflective layer such as a thin metal layer or a thin-film interference filter that has a light transmission of at least 10%, at least 20%, or at least 35%, and less than 65%, less than 70%, less than 80%, or less than 90%).

Layers 34 may include one or more dynamically adjustable light transmission layers such as guest-host liquid crystal devices that exhibit electrically adjustable light transmission (and light absorption and reflection). These layers may, for example, be adjusted to exhibit a transparent state (e.g., transmission of at least 75%, at least 90%, or other suitable elevated light transmission value), an opaque state (e.g., light transmission of less than 25%, less than 10% or other suitable low light transmission value), and can be adjusted to exhibit desired intermediate light transmission values. Additional examples of electrically tunable optical layers that exhibit adjustable light transmission (and adjustable reflection and absorption) and which may sometimes be referred to as light modulator layers or adjustable light transmission layers include liquid crystal devices with polarizers, microelectromechanical systems (MEMs) light modulators, cholesteric liquid crystal layers, switchable metal hydride films (e.g., adjustable magnesium hydride mirror structures), suspended particle devices, electrochromic light modulating devices, or other suitable light modulator layers for adjusting light transmission.

Layers 34 may also include one or more electrically adjustable layers that exhibit tunable amounts of reflection such as cholesteric liquid crystal devices or other adjustable mirror structures. If desired, layers 34 may include one or more adjustable haze layers such as a polymer dispersed liquid crystal layer that can be adjusted between low and high amounts of haze. In a polymer dispersed liquid crystal layer, a polymer layer has voids filled with liquid crystal material that are sandwiched between conductive transparent electrodes on respective first and second transparent substrates. When no electric field is applied to the electrodes, the liquid crystals in the voids are randomly oriented and exhibit an index-of-refraction difference with the surrounding polymer layer. This causes the liquid crystal material of the voids to produce a relatively large amount of haze that scatters light that is passing through the layer. When electric field is applied to the electrodes by control circuitry 16, the liquid crystals of the liquid crystal material in the voids becomes aligned so that the liquid crystal material in the voids exhibits an index of refraction that matches the surrounding polymer. In this configuration, the polymer dispersed liquid crystal layer exhibits low haze and high transparency. Intermediate haze levels may be achieved by applying an electric field at an intermediate level.

If desired, layers 34 may include one or more tunable color filters (e.g., electrically adjustable color cast layers, sometimes referred to as electrically adjustable color layers). During operation, an adjustable color filter may be electrically adjusted by control circuitry 16. The adjustable color filter may be an adjustable-color-cast light filter that can be adjusted to exhibit different color casts and/or may be a monochromatic adjustable-intensity light filter that has a single (monochromatic) color cast. For example, in one state, an adjustable color filter layer may be clear and may not impose any color cast onto light passing through the filter. In another state, the adjustable color filter may be yellow. In yet another state, the color filter may be pink. If desired, the filter may have a monochromatic appearance (e.g., the filter may be a monochromatic adjustable light filter such as a yellow adjustable light filter that can be adjusted continuously or in a stepwise fashion to exhibit appearances that range from clear to light yellow to strongly yellow). The color and/or intensity (saturation) of the color filter may be adjusted continuously (e.g., to any color in a desired color space and/or any strength) or may be set to one of a more restricted group different available colors or range of colors and/or color saturation levels. Color filters for layer 8 may be formed from devices such as a liquid crystal device (e.g., an interference filter with a liquid crystal layer that has an electrically adjustable index of refraction), a phase-change layer based on a chalcogenide material or other materials that can be adjusted to selectively adjust color cast, a guest-host liquid crystal device or other device with an absorption spectrum that can be electrically controlled, an electro-optic device, an electrochromic layer, or any other device that exhibits a tunable color (adjustable color cast) as a function of applied control signals. Adjustable color filters may have electrodes (e.g., an array of individually addressable electrodes) or other structures that allow individual regions of the color filter to be adjusted.

The properties of electrically adjustable optical devices in layers 34 need not be mutually exclusive. For example, one of layers 34 may be a suspended particle device. A suspended particle device contains a layer of nanoparticles suspended in a liquid that is sandwiched between substrate layers with transparent conductive electrodes. In the absence of an applied electric field, the nanoparticles are randomly oriented and absorb light (i.e., the layer is dark and the light transmission of the layer is low). When an electric field is applied, the nanoparticles align and allow light to pass (i.e., the layer appears clear and light transmission is high). In addition to allowing an adjustable light transmission to be obtained, suspended particle devices are characterized by an associated adjustable haze (e.g., a 6% haze when the suspended particle device is off and is exhibiting a low amount of light absorption and a 50% haze when the suspended particle device is on and is exhibiting a high amount of light absorption). In this way, a suspended particle device may serve both as an adjustable light transmission layer and as an adjustable haze layer. Other layers 34 exhibit multiple optical characteristics that change. For example, adjustment of an electrochromic layer may adjust the color cast and light transmission of the layer. Adjustment of a cholesteric liquid crystal layer may affect light transmission as well as reflectivity, etc. In some arrangements, layer 8 may contain a single adjustable layer (e.g., a layer that serves primarily as an adjustable light transmission layer). In other arrangements, layer 8 may contain multiple adjustable layers (e.g., a first layer for adjusting light transmission, a second layer for adjusting haze, a third layer for adjusting reflectivity, etc.). In general, any suitable number of adjustable optical layers 34 may be included in layer 8 and may be electrically controlled by control circuitry 16. Each layer 34 may be controlled individually or sets of two or more layers 34 or all of layers 34 may be adjusted together by circuitry 16.

If desired, layer 8 may be a global layer that extends over all of device 10 (e.g., across all of face F or all of a display, optical sensor, or other optical component 18 on device 10). The appearance of layer 8 may be adjusted to match the appearance of surrounding portions of housing 22 and/or other structures in device 10. For example, device 10 may have housing structures that are black in appearance. When it is desired to visually blend components 18 with the black structures, adjustable layer 8 may be adjusted to exhibit a matching black appearance. As another example, when high optical transparency for layer 8 is desired (e.g., to maximize light emission from component 18 through layer 8 and/or to maximize the amount of light received by component 18 through layer 8), layer 8 may be placed in a transparent state. In general, layer 8 may be adjusted to accommodate any desired operations of device 10 (e.g., changes in the use of components 18, changes in ambient light level and other environmental changes, changes in the operating state of device 10 such as whether images are being displayed on the displays of device 10, etc.).

If desired, the electrically adjustable structures of device 10 may have individually adjustable areas with associated individually adjustable electrodes. This allows the optical characteristics of different areas to be adjusted independently. As an example, a light modulator device may have an array of electrodes or other structures that allow individually adjustable regions to be adjusted between a transparent state (transmission is 100% or nearly 100%) and an opaque state (transmission is 0% or nearly 0%). Intermediate levels of light transmission (e.g., transmission values between 0% and 100%) may also be selectively produced by each of the pixels of light modulator 20. Patterned electrodes such as these may also be used on layers 34 of adjustable haze, adjustable color cast, adjustable reflectivity and/or other adjustable optical properties. If desired, separate layers 8 (e.g., separate devices formed from separate substrates) may be placed in different areas of device 10 to form individually adjustable regions or both electrode patterning and substrate patterning may be used to allow electrically adjustable optical layers such as layer 8 to alter the optical properties of different areas across the surface of device 10 independently.

Figure 4:
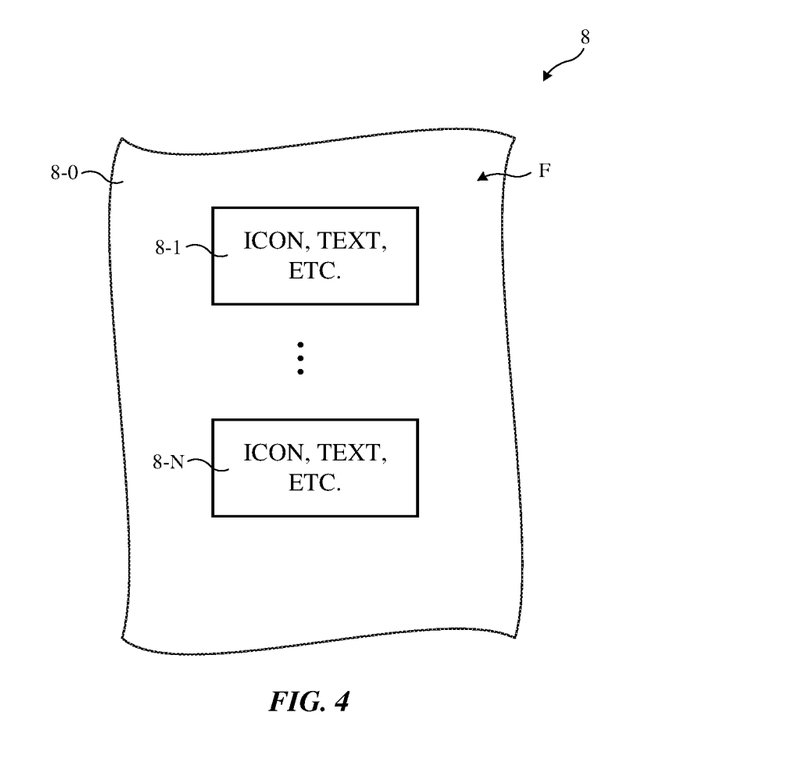
FIG. 4 is a front view of an illustrative electrically adjustable optical layer in accordance with an embodiment.

Electrodes and other structures in each layer 8 can be shaped to form letters, words, and other text, to form icons (symbols), to form decorative patterns, to form solid regions (e.g., a background region), to form a border region (e.g., trim), and/or other desired areas for which optical properties are to be adjusted. This allows control circuitry 16 to use different portions of layer 8 to output visual content. Consider, as an example, the illustrative portion of face F of FIG. 4. As shown in FIG. 4, electrically adjustable optical layer 8 may contain an electrically adjustable optical layer portion such as layer 8-0 that serves as a background and may contain one or more additional electrically adjustable optical layer portions such as layers 8-1 . . . 8-N that are each patterned to form an icon, text, a solid region such as a circular or rectangular window region, trim, or other patterned areas within the background. Portions 8-0 . . . 8-N may be part of a single layer 8 or may include one or more separate layers.

During operation, window regions in layer 8 may be adjusted to exhibit different amounts of light transmission, text or icons can be illuminated when it is desired to convey information about the operation of device 10 to viewers such as viewer 30 (e.g., a user of device 10 or an external viewer when device 10 is worn on a user's head), and/or other adjustments may be made to optical layer 8.

Any suitable criteria may be used by control circuitry 16 in determining how to adjust electrically adjustable optical layer 8. As an example, sensors may gather sensor data, control circuitry 16 may use input-output devices 12 to gather information from a user or from the environment, and/or control circuitry 16 may gather other information (e.g., information on image playback on one or more displays in device 10, information on which optical components 18 are being used, etc.). Based on this input, electrical adjustments can be made to layer 8.

Figure 5:
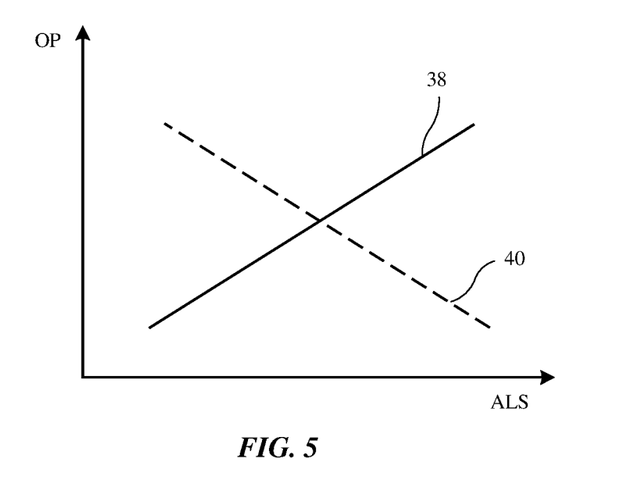
FIG. 5 is a graph showing how optical characteristics of an electrically adjustable optical layer may be adjusted as a function of ambient light level or other criteria in accordance with an embodiment.

Consider, as an example, a scenario in which control circuitry 16 uses an ambient light sensor to gather ambient light measurements. As shown in the graphic of FIG. 5, control circuitry 16 can adjust an optical property (OP) of one or more layers 8 in device 10 based on one or more input values (operating mode state, sensor data, user input command values, etc.). The illustrative input of the graph of FIG. 5 corresponds to an ambient light measurements ALS. If, in this example, ambient light levels rise, optical property OP may be decreased (see, e.g., curve 40 of FIG. 5) or may be increased (see, e.g., curve 38 of FIG. 5). Optical property OP may be light transmission, light reflection, light absorption, haze, color cast, other optical properties of layer(s) 8, and/or combinations of two or more of these properties. Any suitable sensor reading (temperature, movement, orientation, proximity, humidity, etc.), user command, or other information obtained by control circuitry 16 may be used in adjusting layer(s) 8. The use of ambient light sensor information to adjust optical property OP is merely illustrative.

Figure 6:
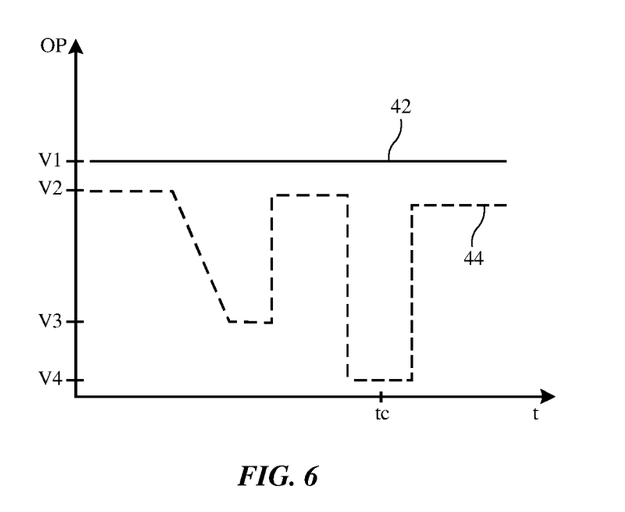
FIG. 6 is a graph showing how optical characteristics of an electrically adjustable optical layer may be adjusted as a function of time in accordance with an embodiment.

FIG. 6 is a graph showing how control circuitry 16 may adjust optical property OP as a function of time t. In the example of FIG. 6, control circuitry 16 adjusts a first layer 8 to exhibit a constant optical property OP (e.g., optical property OP may have a constant value V1 over time, as indicated by line 42) and adjusts a second layer 8 to exhibit a time-varying optical property OP as indicated by line 44 (e.g., optical property OP may be adjusted between high values such as value V2 and low values such as value V4, may be adjusted to intermediate values (see, e.g., intermediate value V3), may be momentarily adjusted, may be pulsed (e.g., to create a flashing effect), may be ramped up or down, and/or may otherwise be adjusted as a function of time based on time-varying and/or static input from sensors, based on user input, based on other information gathered with input-output devices 12, or based on satisfaction of other criteria. For example, OP may be adjusted based on expiration of a timer, reaching a particular date, determining that device 10 has been moved to a predetermined location (e.g., as measured using satellite navigation system circuitry), determining that the operation mode of device 10 has changed (e.g., due to user input, initiation of a media playback event, etc.). If desired, the use of optical sensors 18 can be coordinated with the state of layer 8. For example, an optical component 18 can be used to emit and/or receive light through layer 8 at a time such as time tc of FIG. 6 (e.g., when layer 8 has a low light absorption characteristic and high light transmission characteristic). Layer 8 may, for example, be temporarily placed in a high transmission state so that a camera can capture still and/or moving images, so that an ambient light sensor may take an ambient light reading (e.g., an accurate low light reading), so that a proximity sensor can gather proximity measurements, so that a camera flash can emit flash illumination, so that a status indicator light can emit light for a visible indicator, or for other suitable use of optical sensor 18.

Figure 7:
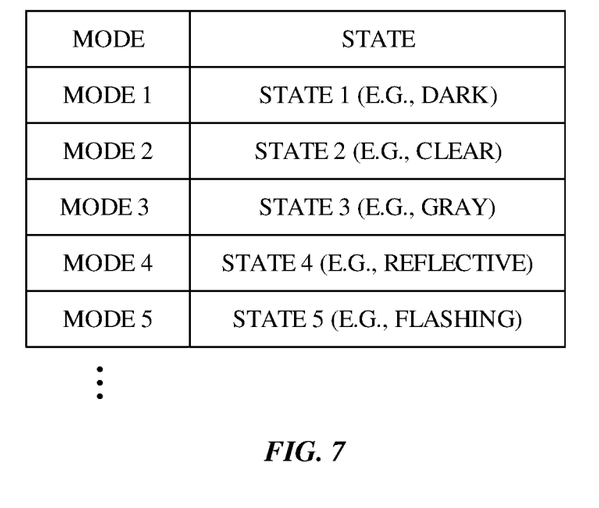
FIG. 7 is a table showing how optical characteristics of an electrically adjustable optical layer may be adjusted based on an electronic device's operating mode in accordance with an embodiment.

FIG. 7 is an illustrative table showing how the state of layer 8 (e.g., the optical characteristics of layer 8) may be adjusted based on the mode of operation of device 10. Different modes of operation may include, for example, whether device 10 is being worn or held by a user or is resting on a table or other surface, whether device 10 is in a low power sleep state or is being actively used by a user, whether device 10 is indoors or outdoors, whether ambient lighting conditions are dark, medium, or bright, whether device 10 is oriented towards viewers such as viewer 30, whether device 10 is being used to capture images (e.g., whether a camera is active), whether infrared optical components 18 are active, whether a proximity sensor, ambient light sensor, and/or depth sensor is active, and/or whether other optical components 18 are being used, whether a particular optical sensor 18 is about to be used or is being used, etc. Different states into which electrically adjustable optical layer 8 may be adjusted include states exhibiting different amounts of light transmission, different amounts of light absorption, different amounts of light reflectivity, different amounts of haze, different colors, etc. In each state, one or more areas of layer 8 may be adjusted and/or fixed and/or time-varying adjustments to one or more of these areas may be made.

As shown in FIG. 7, for example, during operation in mode 1, control circuitry 16 may adjust layer 8 to exhibit low light transmission. In this state, layer 8 is dark and may block optical component 18 under layer 8 from view by viewer 30. Optical component 18 may, for example, be a component that is not being used in mode 1 and/or that does not require large amounts of light transmission through layer 8.

In mode 2, control circuitry 16 may place layer 8 in a second state (e.g., a high transmission state). Mode 2 may, as an example, correspond to a situation in which low light levels are present and/or in which optical component 18 includes an image sensor or other device that benefits from high light transmission through layer 8.

In mode 3, control circuitry 16 may place layer 8 in a third state, characterized by an amount of light transmission that is intermediate to that of the high and low light transmission sates. Mode 3 may, for example, be a mode in which optical component 18 operates satisfactorily light limited amounts of light, so that layer 8 need not be placed in a clear state to allow component 18 to function. In this way, the light transmission level of layer 8 may be maintained at a level that helps block component 18 from view.

Mode 4 in the FIG. 7 example may arise when device 10 is being used outdoors. Layer 8 may be formed on the front of a pair of glasses or other head-mounted device 10. To help obscure optical components 18 from view, the reflectivity of layer 8 may be enhanced (state 4). If desired, layer 8 may be periodically adjusted to facilitate use of components 18. For example, a component 18 may be used for a second (or other suitable time duration) once per minute (or other suitable time interval). During the periods of time in which component 18 is used, the state of layer 8 may be momentarily adjusted (e.g., transmission can be increased to a high transmission level, etc.) to accommodate use of component 18. During other periods of time, layer 8 may be adjusted to provide device 10 with desired properties (e.g., a high mirror reflectivity, a particular color, low light transmission to hide internal components in device 10 such as overlapped optical component(s) 18, etc.).

Mode 4 involves the use of device 10 to display virtual reality content, augmented reality content, or other visual content to a user with display(s) 14 in device 10 (e.g., display systems 14'). When this content is being presented to eye boxes 28, a user of device 10 may be immersed in the content. To alert nearby people such as viewer 30 that the user is immersed in video content (or to alert viewer 30 to other operating modes such as a mode in which video images are being captured with an image sensor in components 18), layer 8 may be placed in a flashing state. If desired, layer 8 may be dynamically configured to display an icon (e.g., by imparting light and dark areas to layer 8 in the shape of an icon and/or by placing layer 8 in a clear state so that an icon of metal, ink, polymer, or other material that is formed under layer 8 is revealed through layer 8). Text and other patterns may also be used to alert nearby people such as viewer 30 that the user is immersed in video content or is recording video. As examples, a "watching video" icon or "recording video" icon, informative text such as "watching video" or "recording video", or a predetermined pattern with a fixed and/or time-varying behavior (flashing, a particular color scheme, haze level, etc.), may also be imparted to layer 8 to serve as a notification to others that the user is watching or recording video. In arrangements in which layer 8 overlaps display 14 (e.g., an array of pixels on front face F configured to display images), layer 8 may be placed in a transparent state while the display is configured to display icons, text, or other information regarding the operating mode of device 10.

In general, this type of alerting mechanism may be used to inform viewers of any mode of operation of device 10 (e.g., whether a visible and/or infrared camera such as a front-facing camera is being used, whether images and/or video are being captured using an image sensor, whether audio is being recorded by device 10, etc.). Information on the state of the user of device 10 may also be revealed. For example, the user's eye movements may be tracked with a gaze detection system and this information can be displayed on the front face of a head-mounted display by time-varying portions of layer 8 or by a display on front face F that is overlapped by layer 8 (e.g., when layer 8 has been placed in a transparent configuration). In arrangements in which device 10 is a cellular telephone or other handheld device, layer 8 may be used to perform these notifications for the user and others who can view layer 8 (e.g., on front face F or other surfaces of device 10). As an example, when device 10 is recording audio, layer 8 may be placed in a transparent mode to reveal an overlapped "recording audio" notification.

If desired, optical component 18 in central region CR may be a display and layer 8 may be placed in a transparent state when it is desired to allow the display to be viewed and may be placed in an opaque (and/or reflective) state when it is desired to hide the display from view. Layer 8 generally has regions that are larger than display pixels. For example, the pixels in a display in device 10 may have lateral dimensions less than 0.5 mm, less than 0.1 mm, less than 0.05 mm, or other suitable pixel dimensions. The display may have at least 1000 pixels or may have at least 10,000 pixels (as examples). The number of regions of layer 8 that are independently adjustable may be less than 100, less than 10, less than 5, or other suitable number. The lateral dimensions of each adjustable region of layer 8 may be 1-10 mm, at least 1 mm, at least 5 mm, at least 20 mm, at least 50 mm, less than 200 cm, less than 50 cm, less than 15 cm, less than 3 cm, or other suitable lateral dimensions. To form icons and text, layer 8 may have pre-patterned icon-shaped regions and/or text-shaped regions, may overlap icons and/or text formed from patterned metal, polymer, or other material, or may have a multiple areas forming a reconfigurable indicator (e.g., seven strip-shaped segments forming a seven-segment indicator for displaying numbers, a sixteen-segment indicator for displaying alphanumeric characters, etc.).

If desired, optical components 18 may be front-facing optical components (components that face front face F of device 10). Layer 8 may be adjusted to enhance the appearance of device 10 from the exterior of device 10, to momentarily change state to facilitate use of components 18 (e.g., to capture an image, to take an ambient light measurement, to make a proximity measurement, to make a depth sensor measurement, to allow camera flash light to be emitted, etc.). Layer 8 may also be adjusted to inform others of the operating mode of device 10 (e.g., to inform viewer 30 of the way in which device 10 is being used by a user). Text, icons, patterned areas such as solid background areas and/or trim areas, and/or other patterned portions of layer 8 may be adjusted, may be pulsed back and forth between alternating first and second appearances, and/or may otherwise be spatially and/or temporally modulated to convey information. If desired, information displayed by layer 8 may be used to inform a user of device 10 of an incoming email, text message, voice call, or other message, an expiring alarm, an upcoming calendar entry, other reminders (e.g., location-based reminders), etc.

Illustrative configurations for layer 8 (and device 10) are shown in FIGS. 8, 9, 10, and 11.

Figure 8:
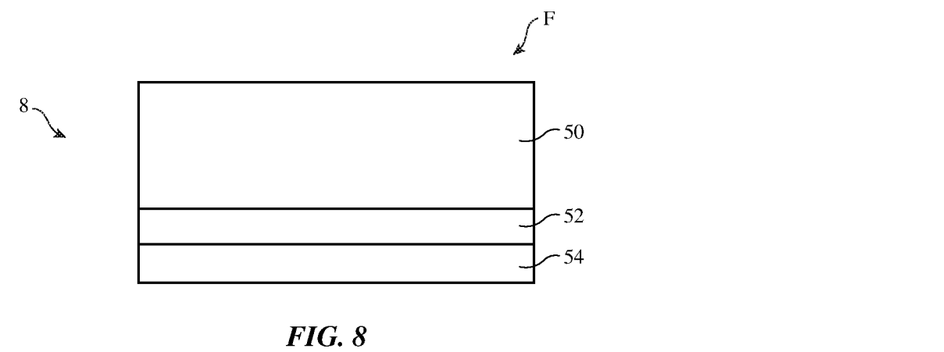
FIGS. 8, 9, 10, and 11 are cross-sectional side views of illustrative electrically adjustable optical layers in accordance with embodiments.

In the illustrative arrangement of FIG. 8, device 10 (e.g., layer 8) may have a supporting layer such as substrate layer 50. Substrate layer 50 may serve as part of housing 22 and/or may be coupled to additional supporting structures. For example, substrate layer 50 may have portions that form a display cover layer for a cellular telephone, tablet computer, or other computer or may form the front portion of a housing in a pair of glasses or other head-mounted device. Substrate layer 50 may be formed from a transparent material such as clear glass or polymer. Layers 52 and 54 may be formed on the inner surface of substrate layer 50. Layer 52 may be a partially reflective layer such as a thin metal coating or a thin-film interference filter exhibiting partial light transmission (e.g., layer 52 may be a partially reflective layer such as a thin metal layer or a thin-film interference filter that has a light transmission of at least 10%, at least 20%, or at least 35%, and less than 65%, less than 70%, less than 80%, or less than 90%).

Layer 54 may be an adjustable light transmission layer. With this arrangement, the presence of an outwardly facing structure such as substrate layer 50 may help protect layers 52 and 54 from scratches and other damage during use. Partially reflective layer 52 may be omitted or may be formed by an adjustable reflectivity layer, if desired.

Figure 9:
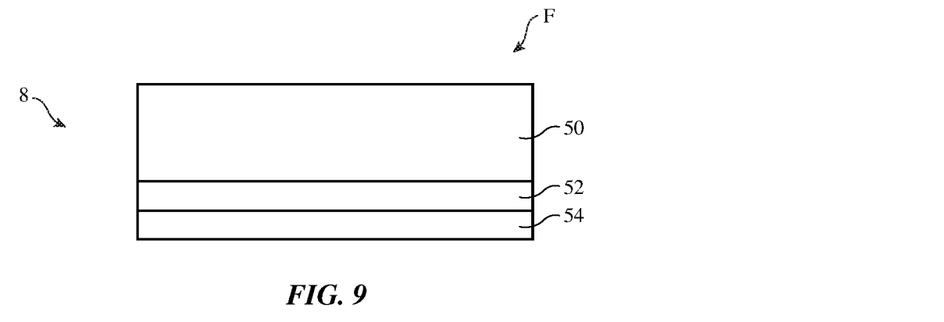

If desired, the positions of layers 52 and 54 may be reversed, as illustrated in FIG. 9. In the illustrative arrangement of FIG. 9, layer 50 is a transparent substrate layer, layer 54 is an adjustable light transmission layer, and layer 52 is an optional partially reflective coating layer. Substrate layer 50 may face outwardly (on face F) and layer 52 may face inwardly.

Figure 10:
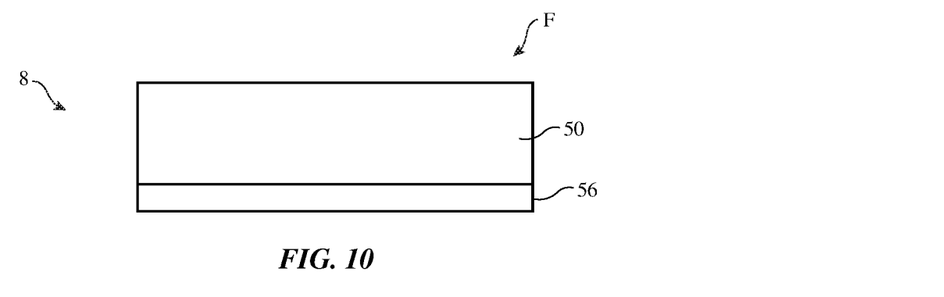

In the illustrative arrangement of FIG. 10, layer 50 is an adjustable light transmission layer and may be adjusted between clear and opaque states. Layer 56 may be a partially reflective coating layer. The appearance of layer 8 of FIG. 10 may be clear and shiny when layer 50 is in a high light transmission shape and may be dark when layer 50 is in a low light transmission state.

Figure 11:
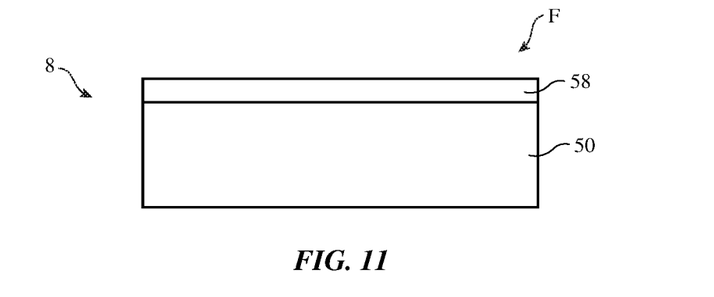

Another illustrative configuration for layer 8 is shown in FIG. 11. In the example of FIG. 11, coating layer 58 (e.g., a partially reflective coating or other coating) may optionally be formed on the exterior surface of substrate layer 50 (e.g., to face outwardly on face F). Substrate layer 50 may be an electrically adjustable light transmission layer. When layer 50 is dark, the light transmission of layer 50 will be low (e.g., less than 5%, less than 10%, or other suitable amount) and layer 8 of FIG. 11 will have a mirror-like appearance (e.g., layer 8 will reflect exterior ambient light and will be shiny). When layer 50 is adjusted to exhibit high light transmission (e.g., at least 60%, at least 70%, or more), the appearance of layer 8 from the exterior of device 10 will be that of a partially reflective mirror (e.g., layer 8 will appear partially reflective) while overlapped interior optical component 18 will be able to operate by transmitting and/or receiving light through layer 8. The use of layer 58 may therefore help provide device 10 with an attractive fully or partially reflective exterior appearance. If desired, layer 58 may be omitted.

Device 10 may include one or more substrate layers that serve to protect interior components (e.g., displays and other optical components 18, etc.) and/or that serve as portions of housing 22. As an example, face F may have a glass or polymer layer that extends across substantially all of front face F. This layer may form a display cover layer for a display (e.g., a display in central region CR in configurations in which device 10 is a handheld or head-mounted device) or may form the front portion of housing 22 (e.g., when housing 22 is configured to form head-mounted support structures such as lenses for goggles, lenses for glasses, a visor for a helmet, etc.). As another example, layers 8 may be formed in window regions. Window regions may be circular, may be rectangular, or may have other suitable shapes. For example, device 10 may have a glass or sapphire disk-shaped layer that serves as a window and that is installed within a metal housing structure, a polymer housing structure, or other housing structure (e.g., a housing wall of polymer, metal, glass, other materials, or combinations of these materials).

The foregoing is merely illustrative and various modifications can be made to the described embodiments. The foregoing embodiments may be implemented individually or in any combination.

What is claimed is:

1. An electronic device, comprising:
   a head-mountable housing;
   an optical component that receives light through a front face of the head-mountable housing;
   an electrically adjustable optical layer that is in the head-mountable housing and that overlaps the optical component, wherein the electrically adjustable optical layer comprises:
     a transparent substrate layer; and
     an adjustable light transmission layer supported by the transparent substrate layer; and
   control circuitry configured to adjust the adjustable light transmission layer between a first state that exhibits a first amount of light transmission when the control circuitry is not using the optical component and a second state that exhibits a second amount of light transmission that is greater than the first amount when the control circuitry is using the optical component.

2. The electronic device defined in claim 1 wherein the head-mountable housing has a rear face opposing the front face and wherein the electronic device comprises:
   a display system on the rear face that is configured to present an image to an eye box, wherein the optical component comprises an image sensor, and wherein the adjustable light transmission layer comprises a guest-host liquid crystal layer.

3. The electronic device defined in claim 2 further comprising:
   a notification structure overlapped by the electrically adjustable optical layer, wherein the notification structure is visible on the front face through the transparent substrate layer when the adjustable light transmission layer is in the second state.

4. The electronic device defined in claim 3 wherein the notification structure comprises a notification structure selected from the group consisting of: an icon and text.

5. The electronic device defined in claim 1 wherein the adjustable light transmission layer comprises an electrochromic layer.

6. The electronic device defined in claim 1 further comprising a partially reflective layer interposed between the transparent substrate layer and the adjustable light transmission layer.

7. The electronic device defined in claim 6 wherein the partially reflective layer has a reflectivity of at least 10% and less than 90%.

8. The electronic device defined in claim 7 wherein the adjustable light transmission layer comprises a liquid crystal layer.

9. The electronic device defined in claim 8 wherein the optical component comprises an optical component selected from the group consisting of: an ambient light sensor, a proximity sensor, a digital image sensor, a light-emitting diode, and a laser.

10. An electronic device, comprising:
wireless transceiver circuitry;
control circuitry coupled to the wireless transceiver circuitry;
an optical component;
an electrically adjustable optical layer overlapping the optical component, wherein the optical component receives light through the electrically adjustable optical layer, and wherein the electrically adjustable optical layer comprises:
a partially reflective layer;
an adjustable light transmission layer, wherein the adjustable light transmission layer is between the partially reflective layer and the optical component, wherein the control circuitry is configured to adjust the electrically adjustable optical layer to increase light transmission through the adjustable light transmission layer while using the optical component.

11. The electronic device defined in claim 10 further comprising a transparent substrate layer, wherein the partially reflective layer is between the transparent substrate layer and the adjustable light transmission layer.

12. The electronic device defined in claim 10 wherein the control circuitry is configured to adjust the adjustable light transmission layer to supply a visual notification while using the optical component.

13. The electronic device defined in claim 10 wherein the control circuitry is configured to alternately darken and lighten a portion of the adjustable light transmission layer to supply a visual notification while using the optical component.

14. The electronic device defined in claim 10 wherein the adjustable light transmission layer overlaps a notification structure that is visible through the adjustable light transmission layer while the adjustable light transmission layer has the increased light transmission.

15. The electronic device defined in claim 10 further comprising a head mountable housing configured to support the optical component.

16. The electronic device defined in claim 15 wherein the optical component comprises an image sensor and wherein the adjustable light transmission layer comprises a guest-host liquid crystal layer.

17. The electronic device defined in claim 10 further comprising a display, wherein the optical component comprises an image sensor and wherein the electrically adjustable optical layer overlaps the display.

18. The electronic device defined in claim 10 further comprising:
a head mountable housing configured to support the optical component; and
a first display configured to present images to an eye box, wherein the optical component comprises a second display that faces away from the eye box.

19. An electronic device, comprising:
a head-mounted housing;
a display system in the head-mounted housing that is configured to present visual content to an eye box;
an image sensor in the head-mounted housing;
an electrically adjustable optical layer in the head-mounted housing that overlaps the image sensor; and
control circuitry configured to adjust the electrically adjustable optical layer to exhibit a first light transmission while not using the image sensor and to exhibit a second light transmission that is greater than the first light transmission while using the image sensor to capture an image.

20. The electronic device defined in claim 19 wherein the electrically adjustable optical layer comprises an adjustable light transmission layer and a fixed partially reflective layer that overlaps the adjustable light transmission layer.

21. The electronic device defined in claim 20 wherein the adjustable light transmission layer comprises a guest host liquid crystal layer.

22. The electronic device defined in claim 19 wherein the electrically adjustable optical layer comprises an adjustable reflectivity layer.

23. The electronic device defined in claim 19 wherein the electronic device has opposing front and rear faces, wherein the display system is on the rear face and faces the eye box and wherein the image sensor is on the front face.

* * * * *